(12) United States Patent
Jaensch et al.

(10) Patent No.: US 6,595,840 B1
(45) Date of Patent: Jul. 22, 2003

(54) FIXING DEVICE FOR FIXING A TOOL

(76) Inventors: Wolfgang Jaensch, Stolbergstrasse 17, D-22967 Tremsbuettel (DE); Carsten Ziegs, Hermann-Balk-Strasse 89, D-22147 Hamburg (DE)

( * ) Notice: Subject to any disclaimer, the term of this patent is extended or adjusted under 35 U.S.C. 154(b) by 0 days.

(21) Appl. No.: 09/763,894
(22) PCT Filed: Aug. 7, 1999
(86) PCT No.: PCT/EP99/05726
§ 371 (c)(1), (2), (4) Date: May 30, 2001
(87) PCT Pub. No.: WO00/12257
PCT Pub. Date: Mar. 9, 2000

(30) Foreign Application Priority Data

Aug. 28, 1998 (DE) .......................... 198 39 341

(51) Int. Cl.⁷ .............................. B24B 23/00
(52) U.S. Cl. .................... 451/358; 125/13.01
(58) Field of Search .............. 125/13.01, 13.03, 125/14

(56) References Cited

U.S. PATENT DOCUMENTS 3,675,689 A  7/1972  Rice .................. 143/32
6,112,736 A  * 9/2000  Bearden ............. 125/13.01

FOREIGN PATENT DOCUMENTS

| DE | 452 537 C | 11/1927 | |
| DE | 70 40 737 U | 11/1970 | |
| DE | 34 44 795 A1 | 4/1986 | B24B/27/08 |
| DE | 92 16 550 U | 5/1993 | |
| GB | 1 207 741 A | 10/1970 | |

OTHER PUBLICATIONS

International Search Report for corresponding PCT application PCT/EP99/05726, mailed Jan. 26, 2000 (3 pages).

* cited by examiner

Primary Examiner—Eileen P. Morgan

(57) ABSTRACT

The invention relates to a holding device for holding a tool, especially an abrasive cutting-off machine, on a guide device, especially on a guiding carriage. The invention may be characterized by holding device which comprises at least one overlapping element via a receptacle, which overlapping element cooperates with at least one holding element on a tool in such a manner that the tool can be suspended by the holding element or elements on the overlapping elements or elements and be transferred by rotation about an axis about a position of use into a held position.

17 Claims, 6 Drawing Sheets

FIXING DEVICE FOR FIXING A TOOL

FIELD OF THE INVENTION

The invention relates in general to a holding device for holding a tool, such as an abrasive cutting-off machine or parting-off grinder, and relates in particular to a guiding carriage.

BACKGROUND OF THE INVENTION

Manual tools such as, for instance, abrasive cutting-off machines, are frequently alternatingly used either in a mobile or a stationary manner. In addition there is frequently a need to fasten the tool to a guiding carriage in order to make the work precise and ergonomically favorable. This makes it possible, for example, to make precise cuts with a defined depth in asphalt or concrete with an abrasive cutting-off machine.

Tools are customarily equipped with holding devices adapted more or less individually to the particular tool, and these holding devices are usually attached to the tool via screws at several locations. This fastening variant is very time-consuming, especially if the tool is to be alternatingly used in a mobile and a stationary manner. Moreover, there is significant potential for danger since if the work is being performed under pressure of time the screws might not be sufficiently tightened, so that in particular very powerful tools, such as, e.g., abrasive cutting-off machines, can become loose from their holder and cause serious injuries.

SUMMARY OF THE INVENTION

The present invention addresses the problem of presenting a holding device with which the tool can be fastened in a simple and rapid manner without the aid of tools.

The problem is solved in accordance with the invention by a holding device with the features such as those of claim 1. Advantageous further developments of the invention can be gathered from the following description and claims.

DETAILED DESCRIPTION OF THE PREFERRED EMBODIMENTS

Figure 1:
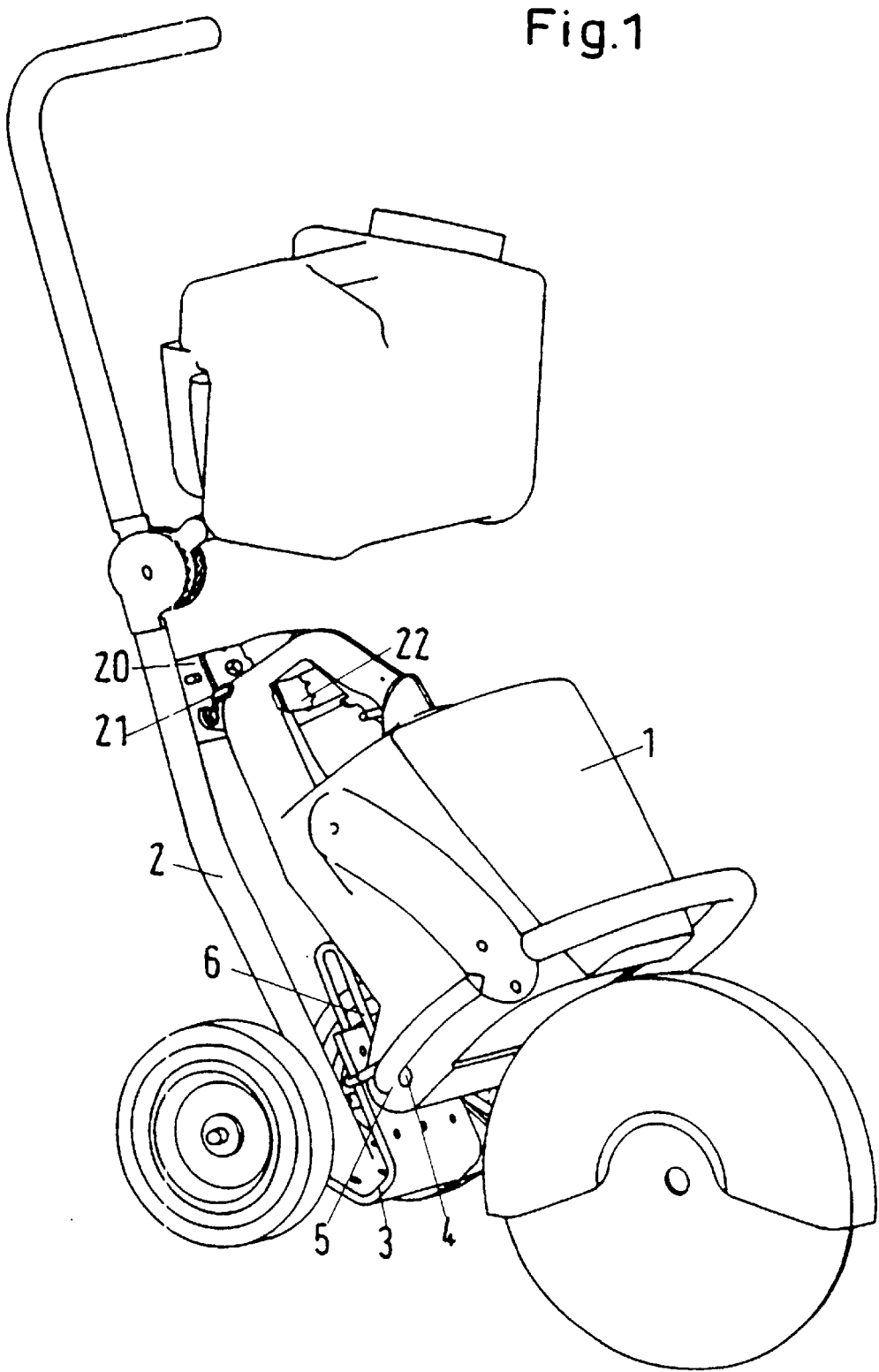
FIG. 1 shows a perspective view of a guiding carriage with an abrasive cutting-off machine mounted on it by a holding device in accordance with the invention.

The holding device for holding the tool in accordance with the invention is particularly suitable for fastening an abrasive cutting-off machine to a guiding carriage, and comprises a first and a second receiving element, where the second receiving element includes a receptacle (or receiving base plate) with at least one overlapping (or hooking) element. This overlapping element cooperates with a holding element (for instance, including a first and a second guide element) on the tool in such a manner that the tool can be suspended by the holding element on the overlapping element of the receptacle. The tool can then be shifted from a starting position into a held position by being rotated about an axis of rotation, or hinge pin.

The holding device of the invention can comprise one or more overlapping elements; in particular, two overlapping elements are preferred. The overlapping elements can be designed as wire hooks. The holding elements of the tool can then be suspended under the hooks.

The tool is shifted from the starting position (in which it can be introduced into the holding device and removed from it) into a held position (in which it is fastened in the holding device) by a rotary movement of the tool about the axis of rotation, which is defined, as a rule, by the arrangement of the holding elements. The fastening of the tool in the held position can be supported in that the receptacle of the holding device cooperates in such a manner with a support surface on the tool that a force is built up during the rotary movement transferring the tool into the held position which force brings about a relative motion between the holding element and the overlapping element. This brings it about that the tool can be readily inserted into the overlapping elements; however, there is still no firm holding of the tool in the position of insertion. During the rotary movement into the held position the support surface is supported in such a manner on the receptacle that the holding elements and the overlapping elements execute a motion relative to each other in such a manner that the holding elements are fixed in the held position by the overlapping elements.

In addition to or alternatively to the relative motion between the holding elements and the overlapping elements a force between the holding elements and the overlapping elements can also be built up during the rotary movement by the supporting of the support surface on the receptacle which force holds both together in the held position.

The support surface can be arranged either on the housing or on the holding element or holding elements in which latter instance all, a few or even only one of the holding elements can of course be provided with a support surface.

The receptacle preferably comprises an elastic element that cooperates with the support surface of the tool. This brings it about that the elastic element exerts an additional force on the tool which force presses the holding elements in the direction of the overlapping element or elements.

As an alternative to the elastic element on the receptacle the support surface can also be designed as an elastic element.

In order to achieve a reliable hold of the tool, the maximum remaining stretch by which the elastic element can still be deformed in the held position of the tool is preferably smaller than the overlap of the overlapping elements over the axis. This prevents the tool from being able to be lifted out of the overlapping element or elements by the action of force counter to the direction of force of the elastic element.

In an advantageous embodiment of the invention the elastic element can have a progressively increasing spring force or power. As a result thereof, the tool can be moved relatively easily in the first range of the rotary motion; however, the last movement section counter to the elastic force that is becoming stronger is more difficult to overcome, but in exchange a firm holding in the holding device is assured. The increase in force during the rotary motion can be advantageously compensated in that the elastic spring force does not perceptibly increase until it is within a range of the rotary motion in which the center of gravity of the tool no longer has to be raised counter to gravity.

The elastic element can be designed, e.g., in the form of an elastic loop or curved piece of metal. This wire loop is preferably designed in one piece with the overlapping element or elements, especially if the latter are designed as wire hooks.

In order to secure the tool reliably in the held position the holding device can comprise a detachable stop device that blocks the rotation of the tool out of the held position in the direction of the starting or insertion position.

In order to introduce the forces occurring during the use of the tool as well as possible into the holding device and avoid undesirable oscillations of the tool during operation it is advantageous to provide a second receptacle that limits the rotary motion of the tool during the suspension procedure upon attainment of the held position. The second receptacle functions as a stop for the device in the held position. Moreover, one or several stops can be provided that limit the motion of the tool normal to the plane of rotation of the rotary motion. This prevents the tool from being fastened crookedly in the holder or from sliding out laterally.

According to an exemplary embodiment of the holding device of the invention the stop device is associated with the second receptacle. The tool is then suspended in the starting position in the first receptacle and transferred into the held position by the above-described rotary motion. It is secured in this position by the stop device on the second receptacle.

A preferred embodiment of a stop device on the second receptacle can be shifted about an axis standing vertically to the axis of rotation of the tool during the suspension procedure from a loosened position into a stopping or blocking position. The blocking motion thus takes place substantially from the side of the tool.

Figure 6:
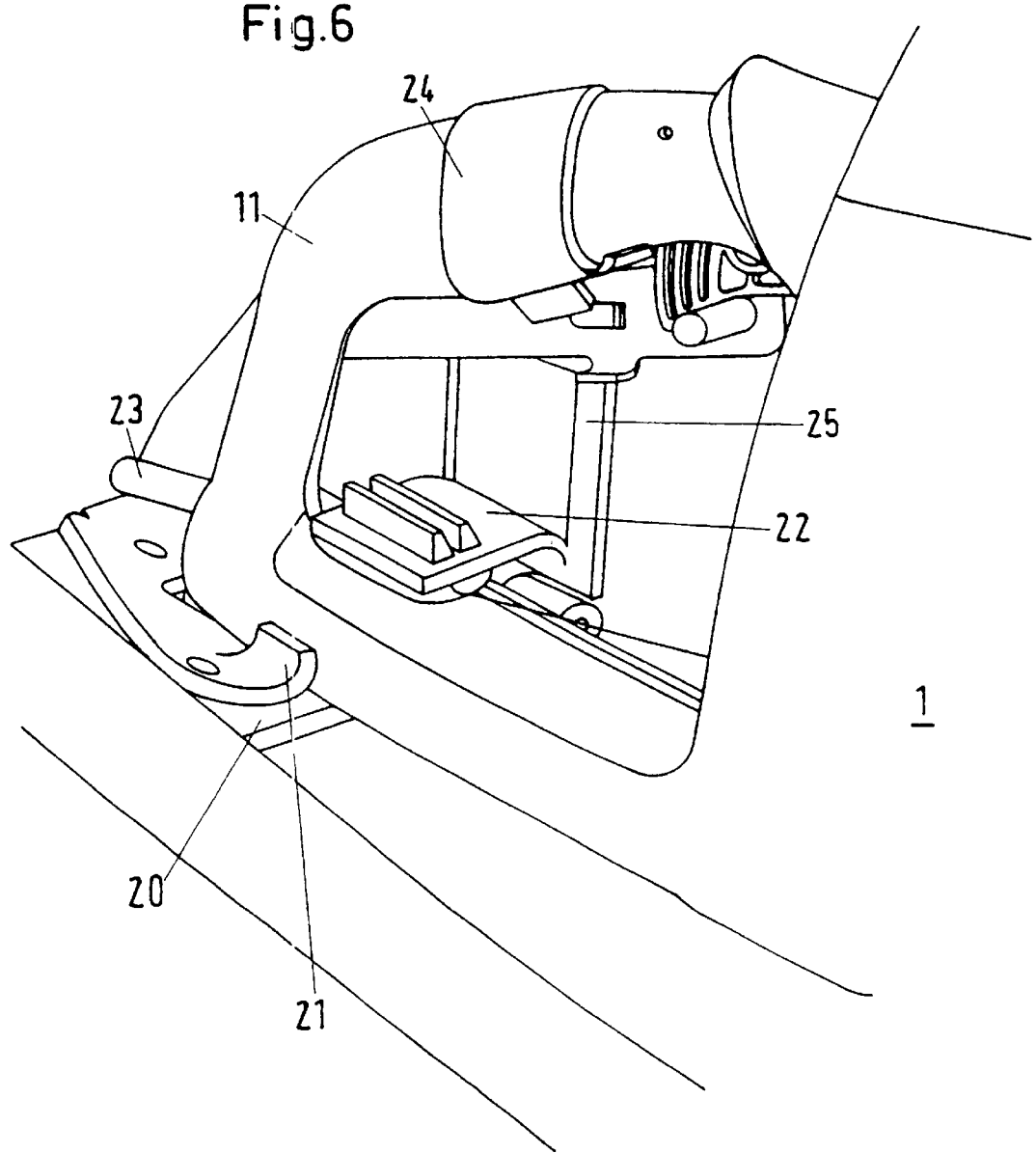
FIG. 6 shows the second receptacle of a holding device in accordance with the invention in a perspective view.

An especially preferred embodiment of the stop device of the invention provides that the stop device comprises a clasp or hasp, shown in FIG. 6, at 24, that cooperates in such a manner with a surface of the tool that the clasp is held in contact with the surface of the tool in the stopping position of the stop device by an elastic force. Thus, the clasp can only be moved out of its stopping position counter to, or against, a force. The tool is secured in the held position without tools having to be used for assembly or disassembly.

The holding device of the invention renders superfluous the screwing of the tool in the holding device. The tool can be inserted into and removed from the holding device in a very short time.

It would obvious to an expert in the art that the holding device in accordance with the invention also functions in the reverse manner, that is, the overlapping element is arranged on the tool and the holding element on the receptacle of the holding device.

The invention is explained in detail in the following with reference made to the drawings.

Abrasive cutting-off machine 1 is fastened on guide carriage 2 shown in FIG. 1. The abrasive cutting-off machine is located in a held position in which it is held by two receptacles 3, 20 on the guide carriage. The first receptacle 3 comprises two overlapping elements in the form of wire hooks 4 that cooperate with tubular holding elements 5 on abrasive cutting-off machine 1. In the held position shown, the cooperation of hook-shaped overlapping elements 4 and tubular holding elements 5 is supported by an elastic element in the form of wire loop 6. Wire loop 6 cooperates with a support surface, that is not recognizable in the drawing, on the housing of abrasive cutting-off machine 1. Abrasive cutting-off machine 1 is brought into the held position shown by a rotary movement about an axis of rotation determined by the position of tubular holding elements 5 under hook-shaped overlapping elements 4.

Abrasive cutting off machine 1 is fixed in the held position by second receptacle 20, that defines a stop in the direction of the rotary movement. Secondly, stops 21 are provided on second receptacle 20 that limit the lateral motion of abrasive cutting-off machine 1 so that it is held in a defined position. Stop device 22, that can be folded laterally over the handgrip of tool 1, serves to fix abrasive cutting-off machine 1 in the held position.

Figure 2:
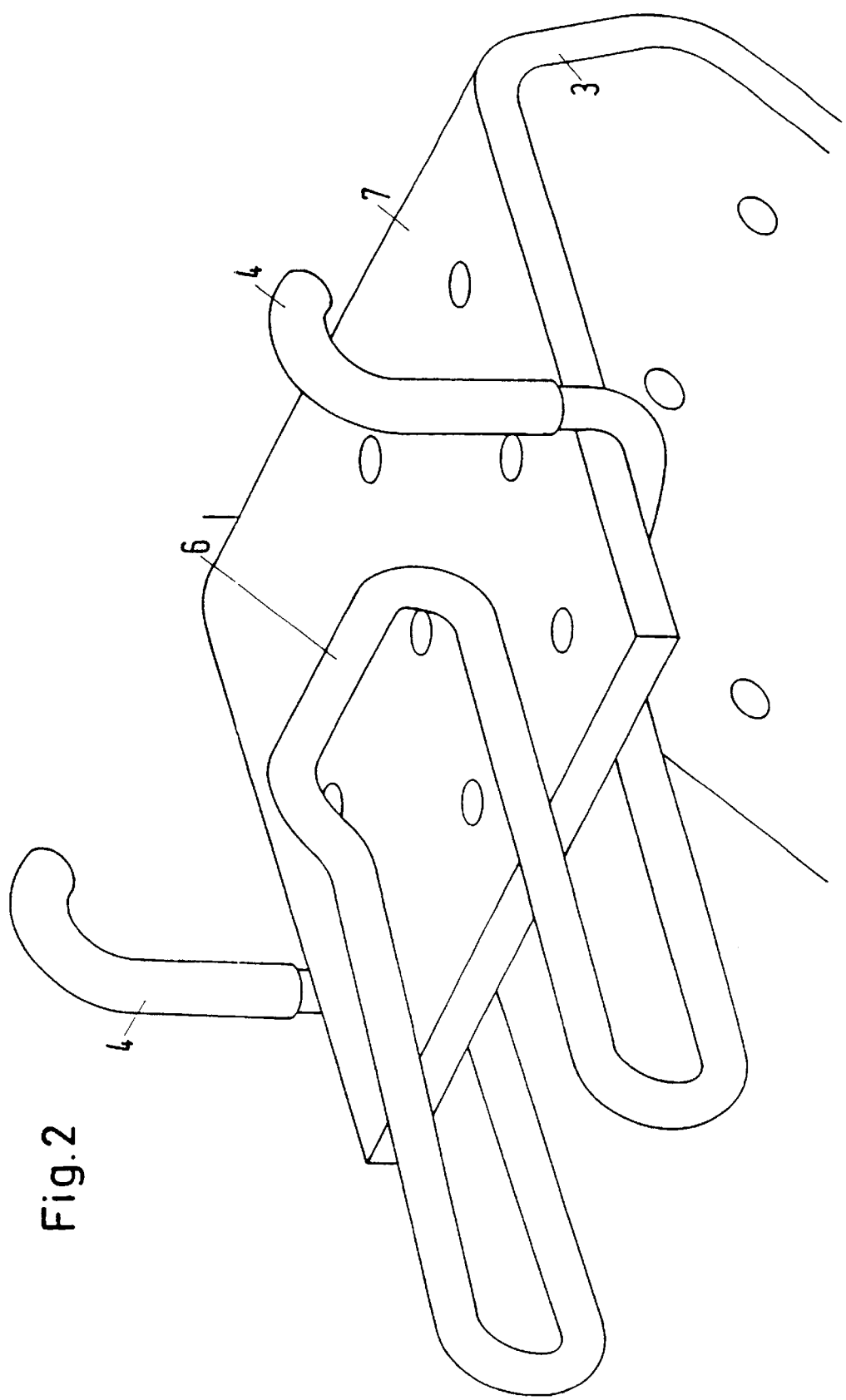
FIG. 2 shows an exemplary embodiment of a holding device in accordance with the invention, without a tool, in a perspective view.

FIG. 2 shows in detail first receptacle 3 of the holding device according to FIG. 1 without inserted tool. Overlapping elements 4 in the form of wire hooks can be recognized, under which the holding elements of the tool (not shown in this figure) are hooked. Furthermore, elastic element 6 in the form of the wire loop can be recognized, that cooperates with the support surface on the tool in such a manner that the holding elements of the tool are pressed during the rotary movement into the held position in the direction of wire hooks 4. Wire hooks 4 and wire loop 6 are designed in one piece and connected by suitable fastening means (not shown) to base plate 7 of receptacle 3. In relieved position, wire loop 6 exhibits a certain interval from base plate 7 in order to assure the elastic action.

Figure 3:
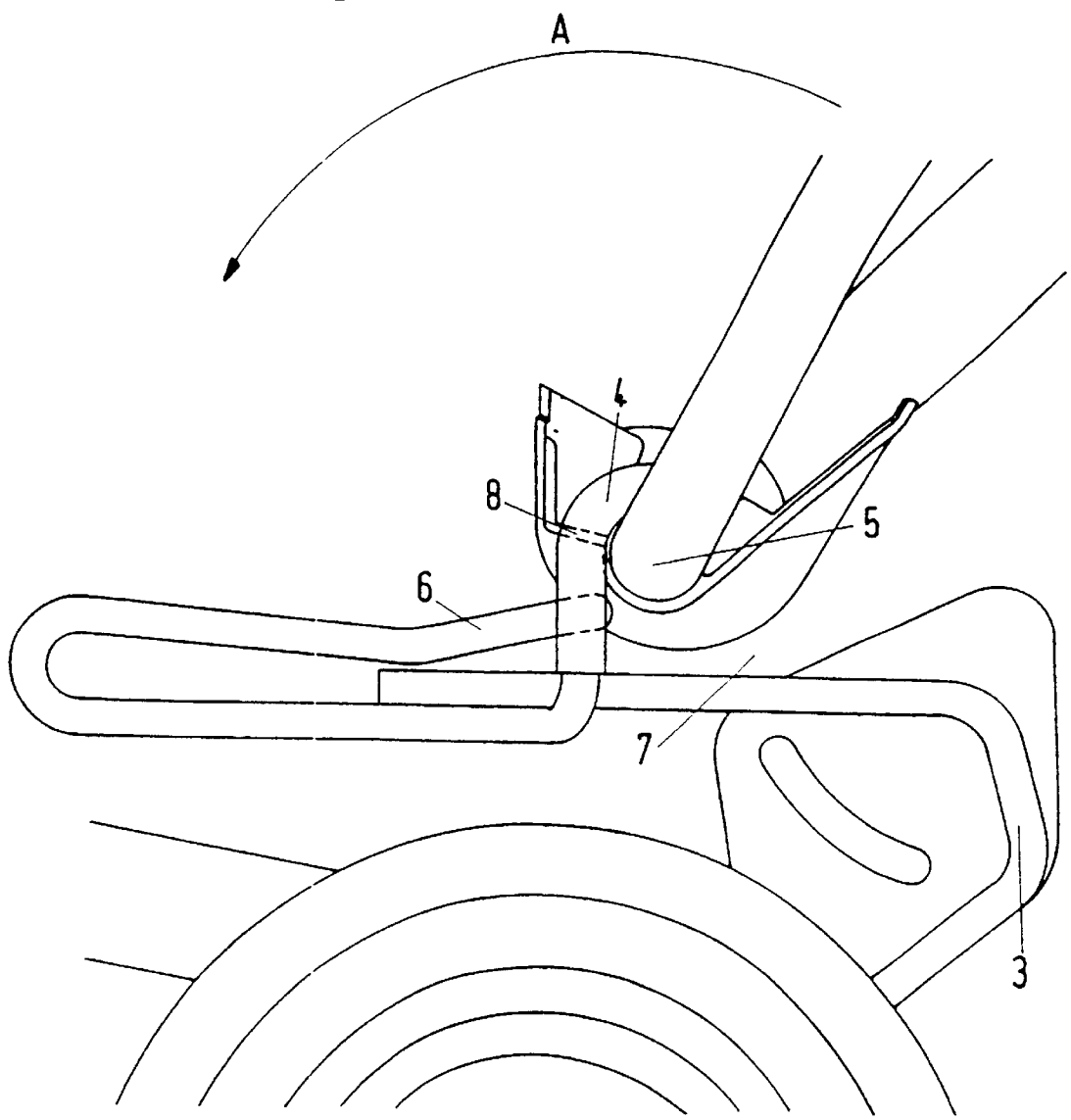
FIG. 3 shows the exemplary embodiment of FIG. 2 with the tool in the insertion position, or position of use, in a lateral view.

FIG. 3 is lateral view of the first receptacle according to FIG. 2. This figure additionally shows tubular holding element 5 of the tool. The tool is located in this view in the position of use [insertion]. It can be recognized that the tool is loosely suspended by tubular holding element 5 under wire hooks 4. The tool is subsequently transferred from this position of use by a rotary movement in the direction of arrow A about an axis of rotation substantially determined by the position of tubular holding elements 5 under wire hooks 4 into the held position. During this movement support surface 8 comes in contact on the tool housing with elastic wire loop 6 that pretensions tubular holding element 5 in the direction of wire hooks 4.

Figure 4:
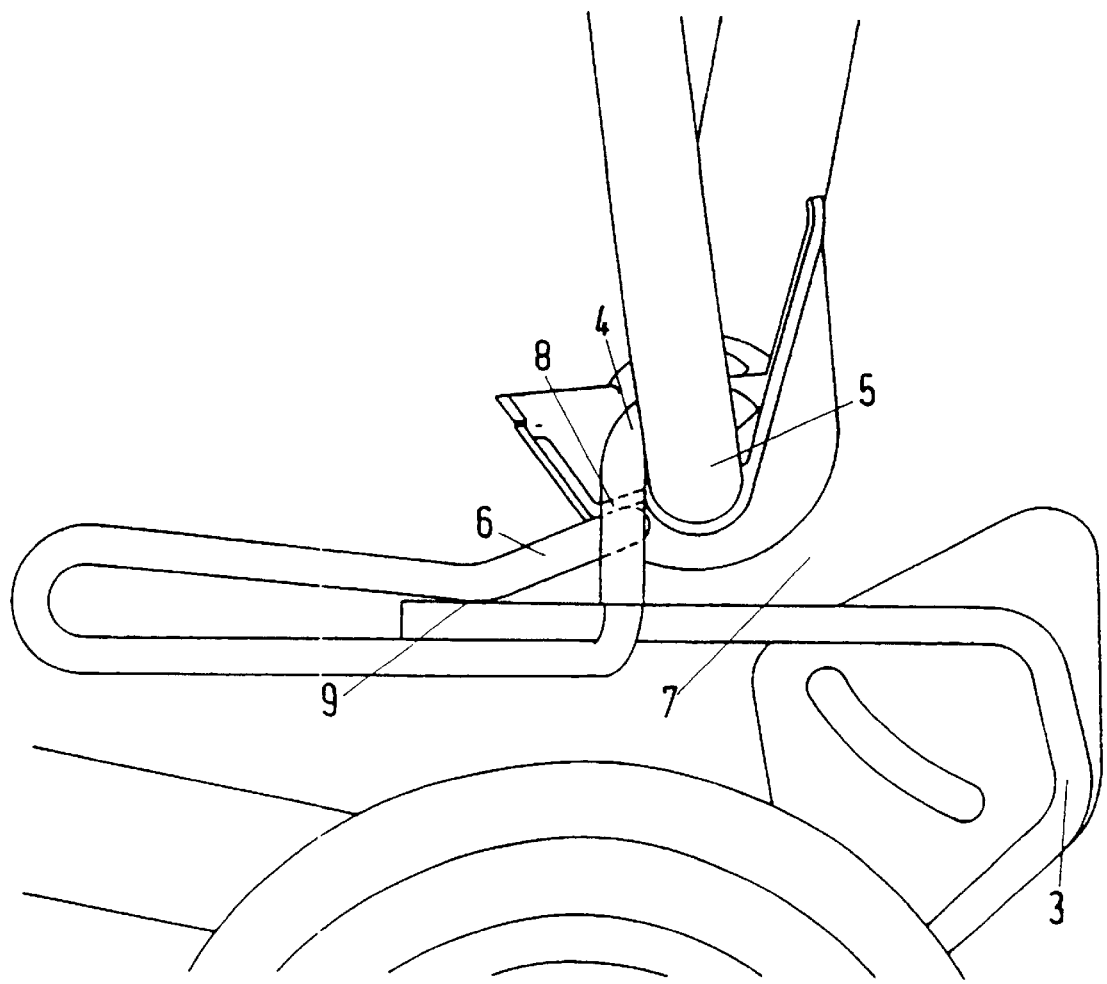
FIG. 4 corresponds to FIG. 3 but the tool is in the held position.

FIG. 4. shows the first receptacle according to FIG. 3. The tool is located in this figure in the held position. It can be recognized that support surface 8 is now in contact with wire loop 6, that pretensions holding element 5 in the direction of wire hooks 4. It can also be recognized that during the rotary movement that transfers the tool out of the position of use into the held position wire loop 6 is first elastically deformed in the left area of the figure so that the force required for this deformation is relatively slight. This elastic deformation is terminated as soon as the wire loop comes at bend 9 into contact with base surface 7 of the first receptacle 3. Thereafter, only the right section of the wire loop is elastically deformed, for which a greater force is required. In this manner holding element 5 is reliably pressed against wire loop 6. A reliable holding of the tool is assured.

Figure 5A:
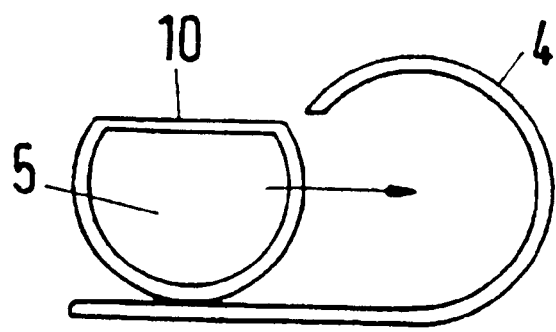
FIG. 5 shows a diagrammatic sketch of another embodiment of the holding device in accordance with the invention.
Figure 5B:
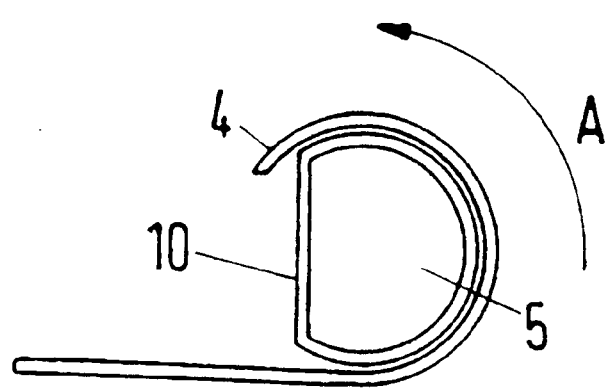

FIG. 5 shows a diagrammatic sketch of another embodiment of the holding device in accordance with the invention. Tubular holding element 5 of the tool comprises a flattened side 10. FIG. 5a shows the position of use or insertion of the tool into overlapping element 4 of the receptacle. Holding element 5 is inserted by the flattened side into overlapping element 4. The tool is transferred into the held position schematically shown in FIG. 5b by the rotary movement in the direction of arrow A that then takes place. Holding element 5 is located in the held position firmly inside overlapping element 4. A removal of holding element 5 out of overlapping element 4 is no longer possible in this position.

FIG. 6 shows the second receptacle of a holding device in accordance with the invention. Handgrip 11 of hand tool 1 can be recognized. The second receptacle 20 functions both as a stop for the rotary movement and as stop 21 for the lateral movement of the tool. The tool is held in the second receptacle by stop [blocking] device 22. The stop device is moved about axis of rotation 23 from a loose position into a stopping position. The stop device additionally comprises clasp 24 arranged on arm 25 of the stop device. The clasp can be set in the upper range over handgrip 11 of the tool. It is automatically held on the handgrip by an elastic force and can only be loosened against this elastic force that is achieved by a spring action of the clasp in itself. Clasp 24 activates at the same time the locking button of the tool located under the clasp so that the tool can be actuated by a remote control without the locking button having to be released manually beforehand.

What is claimed is:

1. A holding device in combination with a tool, said tool comprising first and second guide elements fastened thereto for guiding the tool when in use, said holding device comprising first and second receiving elements for cooperating respectively with the first and second guide elements of said tool, said second receiving element including a receiving base plate with at least one hooking element, wherein the holding device holds the tool in a releasably fixed position such that the at least one hooking element cooperates with said second guide element of the tool in such a manner that the tool can be suspended by the second guide element on the at least one hooking element, wherein the tool can be shifted from a first fixed position into a second fixed position by being rotated about an axis of rotation, wherein the at least one hooking element is shaped such that in the second fixed position a positive connection or a combined positive and negative connection is formed between the at least one hooking element and the second guide element.

2. The holding device according to claim 1, wherein the tool is an abrasive cutting-off machine.

3. The holding device according to claim 1, wherein the guide device of the tool is a guiding carriage.

4. The holding device according to claim 1, characterized in that the at least one hooking element is a wire hook.

5. The holding device according to claim 1, characterized in that the tool further includes a support surface, and the receiving base plate cooperates with a support surface on the tool in such a manner that when a user shifts the tool from the first fixed position into the second fixed position, the second guide element moves toward the hooking element or the hooking element moves toward the second guide element, or both the second guide element moves toward the hooking element and the hooking element moves toward the second guide element.

6. The holding device according to claim 5, characterized in that the tool further includes a housing, and the support surface is arranged on the housing of the tool.

7. The holding device according to claim 5, characterized in that the support surface is arranged on the first and second guide elements of the tool.

8. The holding device according to claim 5, characterized in that the receiving base plate comprises an elastic element that cooperates with the support surface of the tool.

9. The holding device according to claim 5, characterized in that the support surface is an elastic element.

10. The holding device according to claim 8, characterized in that the holding device comprises at least two hooking elements, and the elastic element is deformable by being stretchable, and the maximum stretch by which the elastic element can be deformed in the second fixed position of the tool is smaller than any overlap of the at least two hooking elements.

11. The holding device according to claim 8, characterized in that the elastic element has a progressively increasing spring force.

12. The holding device according to claim 8, characterized in that the elastic element is an elastic wire loop.

13. The holding device according to claim 12, characterized in that the elastic wire loop is connected with the at least one hooking element so that the elastic wire loop and the at least one hooking element form a single part.

14. The holding device according to claim 1, characterized in that the holding device further comprises a detachable stop device for stopping rotary movement of the tool to disengage the tool from the second fixed position.

15. The holding device according to claim 1, characterized in that the holding device further comprises a second receiving base plate positioned in such manner as to limit rotary movement of the tool after the tool is shifted from the first fixed position to the second fixed position.

16. The holding device according to claim 15, characterized in that the second receiving base plate comprises at least one stop for limiting movement of the tool vertical to the plane of rotation of the rotary movement.

17. The holding device according to claim 14, characterized in that the holding device further comprises a second receiving base plate, and that the stop device is connected to the second receiving base plate.

* * * * *